(12) United States Patent
Newton et al.

(10) Patent No.: US 11,153,720 B1
(45) Date of Patent: Oct. 19, 2021

(54) POSITIONING TECHNIQUES FOR DEAD ZONES USING BEACONS

(71) Applicant: Republic Wireless, Inc., Raleigh, NC (US)

(72) Inventors: Matthew Newton, Park Ridge, IL (US); Dayne Batten, Cary, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 17/232,869

(22) Filed: Apr. 16, 2021

(51) Int. Cl.
*H04W 4/029* (2018.01)
*G01S 5/02* (2010.01)

(52) U.S. Cl.
CPC ......... *H04W 4/029* (2018.02); *G01S 5/02521* (2020.05)

(58) Field of Classification Search
CPC ............................ G01S 5/02521; H04W 4/029
See application file for complete search history.

(56) References Cited

U.S. PATENT DOCUMENTS

| 10,798,538 B2* | 10/2020 | Jain | H04W 4/02 |
| 2017/0195947 A1* | 7/2017 | Korneluk | H04W 64/00 |
| 2021/0092611 A1* | 3/2021 | Pasricha | G01S 5/0252 |

* cited by examiner

*Primary Examiner* — Dao L Phan
(74) *Attorney, Agent, or Firm* — Gregory Stephens

(57) ABSTRACT

Techniques are disclosed for determining a location of a mobile device within a dead zone. One example computing system includes a non-transitory computer-readable medium; and a processor in communication with the non-transitory computer-readable medium, the processor configured to execute instructions stored in the non-transitory computer-readable medium to: receive a service request from a communication device, the service request comprising one or more signal strength readings associated with a current position of the communication device; determine, using a trained machine learning model, the current position corresponds to a fingerprint within a location map based on the one or more signal strength readings; and output a control signal configured to cause the communication device to alter a state of the communication device based on location information associated with the fingerprint, wherein the state of the communication device comprises a source or type of network connectivity.

18 Claims, 6 Drawing Sheets

POSITIONING TECHNIQUES FOR DEAD ZONES USING BEACONS

TECHNICAL FIELD

Examples described herein are generally related to techniques for positioning techniques using beacons. Some examples describe techniques that can accurately determine when a device location corresponds to a dead zone using one or more Bluetooth low energy ("BLE") beacons or WiFi network access points ("APs").

BACKGROUND

Many portable communication devices include location determination systems such as, for instance, the Global Positioning System ("GPS") or Global Navigation Satellite System ("GLONASS"). There are numerous instances when the precise location of a device may be of significant importance. However, GPS and other satellite-based positioning systems begin to degrade or may fail in some situations, such as when a device is located indoors, during certain atmospheric conditions (e.g., a presence of clouds, heavy precipitation, etc.), or in the presence of radio frequency ("RF") emissions. For example, standard GPS may suffer from inaccurate elevation measurements, despite providing accurate latitude and longitude information. This lack of precision may be especially compounded in rooms of multi-floor buildings, high-rise buildings, and skyscrapers. Additionally, suboptimal outdoor atmospheric conditions, such as rain, snow, heavy fog, heavy cloud cover (e.g., cumulus clouds), or other adverse weather conditions, can also degrade the precision and accuracy of GPS coordinates.

SUMMARY

Various embodiments of the present disclosure relate to techniques for determining positioning using beacons. One example computing system includes a non-transitory computer-readable medium; and a processor in communication with the non-transitory computer-readable medium, the processor configured to execute instructions stored in the non-transitory computer-readable medium to: receive a service request from a communication device, the service request comprising one or more signal strength readings associated with a current position of the communication device; determine, using a trained machine learning model, the current position corresponds to a fingerprint within a location map based on the one or more signal strength readings; and output a control signal configured to cause the communication device to alter a state of the communication device based on location information associated with the fingerprint, wherein the state of the communication device comprises a type of network connectivity.

One example non-transitory computer-readable medium includes receive a service request from a communication device, the service request comprising one or more signal strength readings associated with a current position of the communication device; determine the current position corresponds to a fingerprint within a location map based on the one or more signal strength readings, wherein the location map comprises a plurality of fingerprints; and output a control signal configured to cause the communication device to alter a state of the communication device based on location information associated with the fingerprint, wherein the state of the communication device comprises a type of network connectivity.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the one or more certain examples.

DETAILED DESCRIPTION

Figure 1:
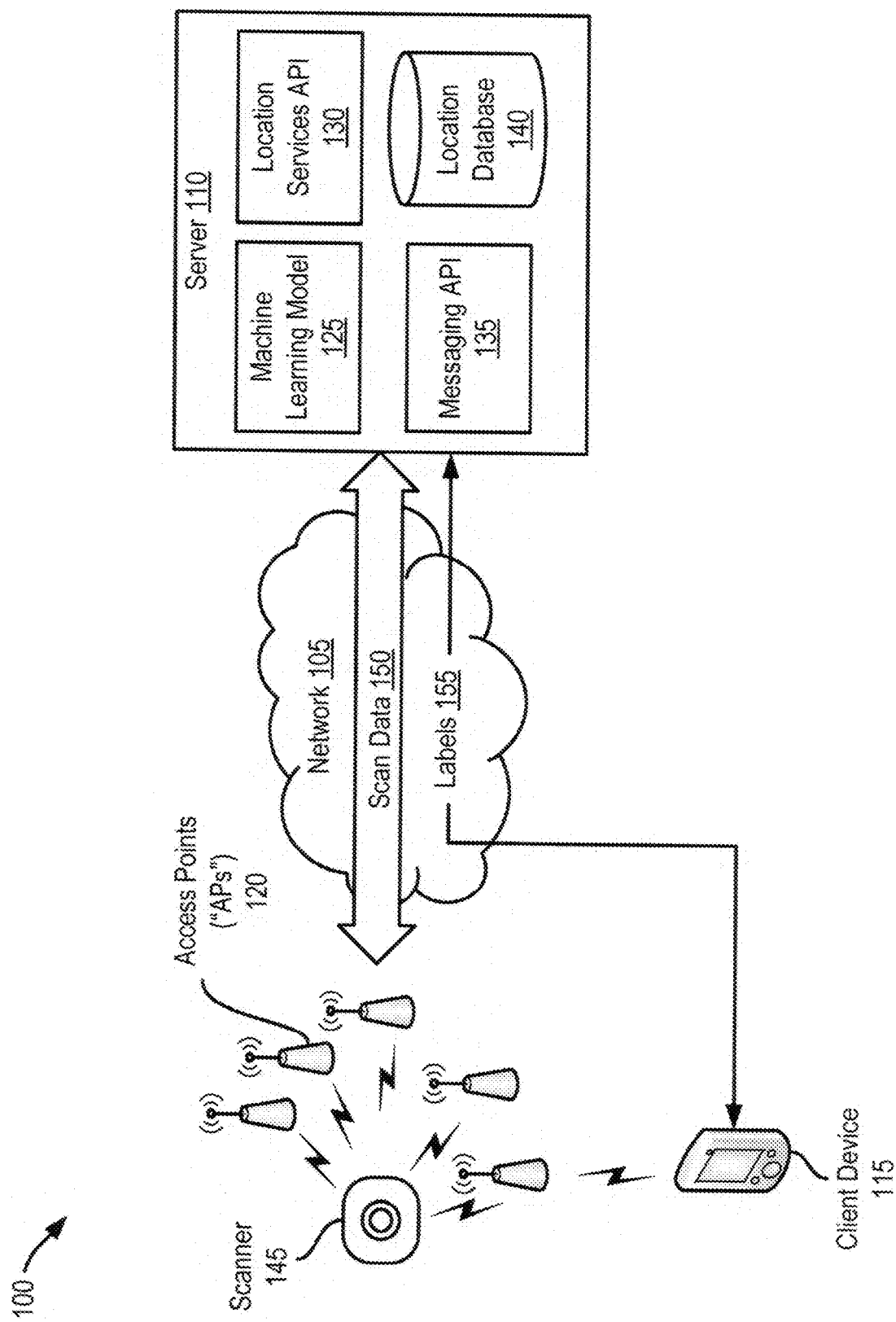
FIG. 1 shows a block diagram for a networked environment used to create and implement a positioning system according to this disclosure.

Certain aspects and features of the present disclosure involve techniques for determining positioning using beacons. Some example systems can provide positioning services using a client device. Further, some example techniques can provide positioning services, using more accurate location information, which can be obtained from beacons via a communications network, such as a communications network suitable for making and receiving text messages or telephone calls. This increase in accuracy of location information can be used to provide positioning services that enables certain types of network connectivity in dead zones. Enabling such alternate network connectivity in dead zones can reduce an amount of time for first responders to provide aid to those in need, track employees or inventory, locate lost or missing devices, etc.

The illustrative examples described herein disclose systems, methods, and computer program products for creating, mapping, and implementing a positioning system based on the operation of APs. These APs may include 802.11 (or later) WiFi APs, Bluetooth beacons, BLE beacons using the Bluetooth 4.0 low energy standard (or later), Wi-Fi Aware beacons, near field communication ("NFC") reader, radio frequency identification ("RFID") reader, or another suitable AP. The systems and methods of the invention may be implemented in and performed by network based communications server(s) and other related components (e.g., databases), and software instructions executed by some or all of such devices and components, as will be explained in detail below.

The description of illustrative examples are provided merely as examples, not to limit or define the limits of the present subject matter, but rather to provide examples to aid understanding thereof. Various examples are described herein, which provides further description, and variations of such examples would be understood by one of skill in the art. Advantages offered by various examples may be further understood by examining this specification and/or by practicing one or more examples of the claimed subject matter.

People commonly use wireless devices, such as smartphones, within an indoor or a geofenced location. Geofenced locations are regions that have been defined using points within a coordinate system, e.g., latitude and longitude, and positions falling within the region defined by these points are within the geofence. For example, geofenced locations may be areas that are created by defining one or more real or virtual boundaries. These real or virtual boundaries may circumscribe or otherwise encompass a particular area of interest or region of interest ("RoI"). In some examples, a user may create a geofenced location by designating or assigning a label to an area using a graphical representation of a mapped area. For instance, a user may create one or more geofenced locations in a building, such as a house or an office building. In some examples, the geofenced locations may include rooms in the house, floors in the office building, or rooms in the building (e.g., a lobby, conference rooms, common areas, etc.). In other examples, the geofenced locations may correspond to outdoor locations, such as holes on a golf course, areas at a concert venue, RoIs in a park (e.g., a management office, restrooms, attractions, open areas, fenced locations, etc.)

While accurately locating a device is useful, it can be difficult. This can be the result of difficulties receiving traditional location services (e.g., using GPS). But it can also be due to the nature of the locations provided by such services, especially when trying to find a person within a building or an outdoor geofenced location, such as a golf course. For instance, locations within a building are typically given with respect to a particular floor and room, while locations in a geofenced golf course may be labeled by a hole number rather than more precise coordinates. In particular, neither of these examples include geographical coordinates. Thus, mapping locations in a way that enables a device to determine its location in terms of more global coordinate systems could provide a number of advantages.

There are numerous instances where accurate mapping and location functions may provide significant benefits. For instance, accurate mapping and location functions can provide improvements in real world applications such as a deployment of emergency services; employee productivity or tracking; locating lost, missing, or stolen devices; or inventory tracking or loss prevention among others. The present disclosure provides location services that include such mapping and location functions. For example, the positioning system provides mapping that includes generating one or more heat maps for a floorplan and/or a geofenced location.

One solution to improve accuracy may involve deploying an array of fixed beacons (e.g., BLE beacons, WiFi APs, etc.) that are tied to known locations. These fixed beacons may then transmit beacon signals that provide information about the transmitting beacon, such as an identifier, a room number, a floor number, etc. Certain aspects according to this disclosure leverage existing WiFi APs to provide scan data for positioning. Additionally, certain aspects utilize BLE beacons to provide scan data for positioning. Advantageously, BLE beacons may provide an inexpensive solution to bolster positioning scan data that may already be obtained from existing WiFi APs. Further, BLE beacons may have a sufficiently small form factor, footprint, or overall size that enables multiple BLE beacons to be positioned in a myriad of positions throughout an indoor space or a geofenced location.

Thus, when a device connects to, or receives signals from, one of these fixed beacons, it can determine its location based on a correspondence, for example, to a mapping, between the source of the received signals and the established physical location of that source. This solution can provide very good accuracy when deployed throughout a location. By doing so, an area of interest can be mapped to a certain level of precision based on the number of such signal sources and where they are located. Since most residential and especially enterprise locations utilize WiFi for Internet access, they will have deployed one or more WiFi APs. Thus, using WiFi APs, BLE beacons, or a combination of the two according to certain aspects of this disclosure, the positioning system can more accurately map an area of interest.

However, in some cases the positioning system may determine that a current position of the communication device corresponds to a dead zone. Dead zones may include one or more locations and/or areas of interest that have a lack of network connectivity. For instance, a dead zone may lack one or more types of network connectivity, such as a cellular service, a Wi-Fi service, or a point-to-point (P2P) connection, etc. In response to determining the communication device is positioned in a dead zone, the positioning system can send a control signal to the communication device. The control signal may cause the communication device to alter a state of the communication device, for example, to change radio settings to access an available type of network connectivity or to power off an RF transceiver corresponding to the unavailable network. Further, certain aspects described herein provide a notification to the communication device that indicates a change to the type of network connectivity.

Accordingly, this disclosure describes techniques for utilizing the existing WiFi APs or other infrastructure wireless communications devices, in combination with BLE beacons, to more accurately map an area of interest throughout a given location. Once these areas of interests have been accurately mapped, a positioning system may then be subsequently used to locate devices within a given area of interest in real time. Further, when devices are located in a dead zone, the positioning system can ensure network connectivity by providing a control signal to alter a state of the device. In some examples, the positioning system may be located remotely (e.g., on a networked server). In other examples, the positioning system may provide an indoor location locally, for example, via a location services application that is being executed on a client device.

Ensuring network connectivity may be desirable for a number of reasons. Users frequently use their mobile devices to send and receive messages and/or make calls. These mobile devices can include numerous software applications that allows users to communicate with networked users or entities (e.g., via the Internet). For example, in an emergency, a user may need to request emergency services for assistance from a law enforcement agency ("LEA"), fire department, emergency medical services ("EMS"), hazardous materials ("HAZMAT") response team, etc. In this example, users may request emergency services via an application that supports location-based services.

Continuing with this example, a user can place a call or send a text message with a request for emergency services. In the event that the device is located in a dead zone, the positioning system can send the device a control signal that alters a state of the device to access an available type of network connectivity to ensure the user can reach the desired emergency service. Thus, certain aspects described herein can provide connectivity and accurate location information to emergency service dispatchers to increase an efficacy of requesting such emergency services.

Techniques described herein can be used to more accurately determine locations for communications devices in an indoor location, outdoor geofenced location, space, or area of interest that is covered by multiple BLE beacons, WiFi APs, or other wireless transmitters or APs. Certain aspects include a positioning system that provides more precise location services for communication devices that enter or traverse a dead zone associated with these locations. Advantageously, the positioning system described herein may provide valuable location services, which may enable first responders to receive more accurate information for users in dead zones. In other examples, the positioning system allows for tracking employees or inventory items, thereby increasing productivity of a business or providing loss prevention using data associated with the users in the dead zones. The positioning system may be implemented in a cost-conscious manner, for example, by leveraging existing WiFi APs and/or utilizing low-cost BLE beacons.

Reference is now made to the drawings, wherein like reference numerals are used to refer to like elements throughout. In the following description, for purpose of explanation, numerous specific details are set forth in order to provide a thorough understanding thereof. It may be evident, however, that various examples can be practiced without these specific details. In other instances, well known structures and devices are shown in block diagram form in order to facilitate a description thereof. The intention is to cover all modification, equivalents, and alternatives within the scope of the claims.

With general reference to notations and nomenclature used herein, one or more portions of the detailed description above or which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations require physical manipulations of physical quantities. Usually, though not necessarily, these quantities take the form of electrical, magnetic, or optical signals capable of being stored, transferred, combined, compared, or otherwise manipulated. It proves convenient at times, principally for reasons of common usage, to refer to these signals as bits, values, elements, symbols, characters, terms, or numbers. It should be noted, however, that all of these and similar terms are to be associated with the appropriate physical quantities and are merely convenient labels.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

FIG. 1 shows an example of a block diagram for a networked environment that is used to create and implement a positioning system 100 according to certain aspects of this disclosure. The example positioning system 100 includes access points ("APs") 120 that facilitate communication between a client device 115, scanner 145, and server 110, for example, via communications network 105. A communications network 105 may be a combination of wired and/or wireless networks, including without limitation a direct interconnection, secured custom connection, private network (e.g., an enterprise intranet), public network (e.g., the Internet), personal area network ("PAN"), local area network ("LAN"), metropolitan area network ("MAN"), operating missions as nodes on the Internet ("OMNI"), wide area network ("WAN"), wireless network (e.g., 802.11 WiFi), cellular network, or other communications networks.

The positioning system 100 includes a number of APs 120 that have been positioned about a location of interest, such as a floor of an office building, a house, a mall, a movie theater complex, a drive-in movie theatre, a golf course, etc. The APs 120 facilitate communications between client device 115, scanner 145, and server 110, e.g., via communications network 105. Some APs 120 may be placed to provide wireless communication interfaces between devices (e.g., client devices 115) within the location of interest and a network (e.g., network 105). Other APs 120 may be placed to output wireless signals to assist in providing location services in the system 100. Still others may be provided for other reasons. Any suitable wireless AP 120 may be used, such as WiFi APs, Bluetooth or BLE beacons, IEEE 802.15.4 mesh devices, mobile radio access networks ("MRANs"), etc.

In some examples, APs 120 may be WiFi APs that are capable of operating in dual bands of 2.4 GHz and 5 GHz. Further, each of the APs 120 may also be WiFi APs, BLE beacons, or WiFi APs that include an integrated BLE beacon. In some examples, an overall quality or precision of the location services provided by the server 110 may be enhanced by including both a 2.4 GHz and 5 GHz signal strength reading for each of the WiFi APs 120. Further, the scan data 150 may include BLE beacons or WiFi scan data that includes an associated RSSI reading that is expressed in dB or some other discernible strength parameter for each AP 120. Other types of wireless transmitters or APs may be used in some examples, such as wireless mesh devices (e.g., operating using the 802.15.4 wireless standard), Internet-of-Things ("TOT") wireless devices, NFC, etc.

The example positioning system 100 includes a scanner 145 that may be mobile device that is capable of scanning for RF signals such as WiFi, Bluetooth, BLE, IEEE 802.15.4, or other types of RF signals. In some examples, the scanner 145 may also be a client device. Further, in some examples, the scanner 145 may be accessed via a scanning application or graphical user interface ("GUI") that is displayed on such a client device. In some examples, the scanning application may be a routine, feature, function, software component, or API that is available in a location services application. Further, the scanning application may be available in a distributed environment, for example, that is available via a remote procedure call. The scanner 145 is in communication with server 110 via communications network 105 and/or APs 120.

In the example positioning system 100, the scanner 145 moves around the area of interest and scans for RF signals (e.g., BLE beacon signals, WiFi signals, etc.) to detect RF signal information at various locations. For example, scans may be performed at intervals of one meter within the area of interest to establish a grid of scan locations within the area of interest. The RF signal information may include, for example, a signal type, network name (e.g., service set identifier ("SSID")), media access control ("MAC") address (e.g., basic service set identifier ("BSSID")), signal strength (e.g., received signal strength indicator ("RSSI"), channel, data rate, encryption format, etc. In some examples, the RF signal information may include timing information (e.g., a timestamp, time of arrival, periodicity, or other timing data). In this example, the scanner 145 scans for RF signals and obtains RF signal information that is associated with a set of APs 120. Each of the measurements taken by the scanner 145 of the various received signals at each of the various scan locations within the area interest are then collected as scan data 150, which may then be sent to a server 110 that is capable of providing location services. The server 110 can use the scan data 150 to train a machine learning model 125, which is discussed in greater detail below.

The scanner 145 scans for the APs 120 that are dispersed throughout an area of interest. An area of interest may correspond to an indoor location within a building or an outdoor geofenced location. For instance, the area of interest may include an office floorplan, a floor in a building, a set of rooms, a space in a building, a portion of a space in a building, a particular room such as an office, a conference room, a breakroom, a restroom, etc. In some examples, the scanner 145 scans for RF signals to obtain signal strength readings that may be used to map the indoor location. The scanner 145 sends scan data 150 that corresponds to the RF signals and/or RF signal information to server 110.

In some examples, the area of interest may broadly include a location corresponding to a street address, a building, or a geofenced location. In other examples, the area of interest can describe a floor within a building, a floorplan map, a portion or section of a building, a room or group of rooms, an area within a room, etc. Further, the area of interest may be assigned a name. For example, the area of interest may have a predefined label or a user-defined label that corresponds to or otherwise describes the area of interest, such as a room number, conference room name, etc. The positioning system 100 described herein can use these labels and/or areas of interest to generate "fingerprints" using certain characteristics. For example, "fingerprints" for specific labels, locations, or areas of interest can be determined using signal strength readings from APs 120 that are spread throughout the building. These fingerprints may include identifiable parameters associated with respective APs that allow the positioning system 100 to more accurately map areas of interest within the building.

The scanner 145 may include custom software designed to recognize BLE beacons, WiFi, wireless, or other suitable APs 120 and/or WiFi APs 120. The scanner 145 can include software that is capable of scanning for, or otherwise detecting, RF signals associated with the APs 120. For example, the scanner 145 may detect beacon frames for the APs 120. A beacon frame may include a MAC address header, a body, and a frame check sequence ("FCS"). A body of a beacon frame may include a timestamp, a beacon interval, a network capability, SSID, other timing information, network information, other parameters, etc. Further, the scanner 145 may obtain signal strength readings from each AP 120 and organize the signal strength data into a signal strength data set (e.g., scan data 150) that is referred to, more generally, as advertising data, service advertisements, beacon data, BLE beacon data, WiFi scan, or WiFi scan data, etc. In one example, the scan data 150 may include a beacon frame that includes of a MAC address of an AP 120.

The scanner 145 can obtain scan data 150 for an AP 120, which may incorporate the signal strength reading for a 2.4 GHz band, 5 GHz band, and/or a BLE beacon. At any given moment, the scanner 145 may be able to pass scan data 150 to the server 110 via the communications network 105. The server 110 may then store the received scan data 150. For example, the server 110 can store the scan data 150 in the location database 140. The server 110 may perform the processing described herein.

In this example, the server 110 provides location services for positioning, according to certain aspects. The server 110 shown in FIG. 1 includes several components, including a machine learning model 125, location services API 130, messaging API 135, and location database 140. Further, components of the server 110 may be hardware devices, but in some examples, each of the components of the server 110 can include one or more software applications or virtual machines being executed by one or more processors. In some examples, server 110 may be a cloud computing device.

The server 110 receives the scan data 150 from the scanner 145 via the communications network 105. Additionally, the server 110 can receive labels 155 from the client device 115 via the communications network 105. In some examples, the labels 155 may be predefined name that is associated with an area of interest. In other examples, the labels 155 may be designated by a user of the client 115, for example, via a location services application. The server 110 includes a location database 140. The server 110 can use the location database 140 to store location information (e.g., scan data 150 and labels 155). However, it should be appreciated, that in some examples, the location database 140 may not be co-located with the server 110.

The server 110 also includes the machine learning model 125. In this example, the server 110 may train the machine learning model 125 to determine a location of a device when location services are requested. The machine learning model 125 may be trained using any suitable deep learning technique. For instance, the machine learning model 125 may be trained using a deep neural network ("DNN") (e.g., a recurrent neural network (RNN), long-short term memory network ("LSTM"), convolutional neural network (e.g., a region convolutional neural network ("R-CNN") or Fast R-CNN), a deep residual network (e.g., ResNet-101), etc. Once trained, the server 110 may execute the trained machine learning model 125 to identify a current location of a device in response to a request for location services.

Training the machine learning model 125 may involve obtaining a corpus of training data. For example, the server 110 may receive location information from the scanner 145 that is associated with a multiple areas of interest. In this example, the corpus of location information includes signal strength readings at various scan locations for areas of interest within a building, such as offices, conference rooms, workrooms, break rooms, lobbies, etc. In some examples, each area of interest may include one or more signal sources, such as one or more APs 120.

For instance, each area of interest may include a signal source that is an AP 120. Each of the APs 120 can provide the scanner 145 with scan data 150 at various scan locations that indicates a signal strength reading for each detectable AP 120. In some examples, the locations of each AP 120 may correspond to a label 155 corresponding to an area of interest. Further, each label 155 may correspond to location information (e.g., a floorplan, geofenced region, location data, labels 155, etc.) that is associated with an AP 120 (e.g., a MAC address associated with an AP 120). In turn, the scanner 145 can provide the scan data 150 to the machine learning model 125 via the communications network 105 and the server 110.

In one example, the corpus of training data also includes a floorplan. Further, the training data and/or floorplan may include one or more physical characteristics of a building. For instance, the machine learning model 125 can retrieve a floorplan of the indoor location that includes pre-labeled areas of interest (e.g., rooms, hallways, common areas, walls, floors, levels, etc.). In some examples, the floorplan of the indoor location may also include locations for areas of interest and a list of APs 120 corresponding to their relative positions associated with the floorplan. The machine learning model 125 can use location data from the scan data 150 to generate a map of the indoor location that includes the relative strength of the signal readings for various areas of interest using the floorplan. This can help resolve ambiguities when later attempting to determine a device's position in the area of interest. For example, a potential location may be excluded due to a physical obstacle or being physically unrealistic.

In some examples, the corpus of training data may include an effective range of an AP 120. The effective range may be associated with a predetermined distance associated with an AP 120. But in some examples, this predetermined distance may not necessarily reflect an actual range for which a RF signal is observable. For example, a presence (or absence) of certain physical barriers, such as interior or exterior walls may increase or reduce an actual range that a RF signal is observable. In some examples, a clear line of sight may increase a physical distance or other spatial relationship for which the RF signal corresponding to an AP 120 is observable. Further, in some examples, the training data may include a location history (e.g., one or more last known locations). Advantageously, training data that includes the effective range of an AP 120 may be used to reduce a number of detected signals that appear to be beyond the effective range (e.g., RF signals that are detected by a scanner 145 but indicate a significant distance from the AP 120).

In some examples, when initially scanning an area to gather training data, a greater number of scans for an area of interest may provide the machine learning model 125 with a greater amount of training data. Such an increased amount of training data may allow the machine learning model 125 to map the area of interest with increased accuracy, thereby improving an overall accuracy of the positioning system 100. For instance, when obtaining training data, a user that is walking through an area to be mapped, and is in possession of a scanner 145, can collect scan data for multiple locations within an area of interest. The scanner 145 may collect a greater amount of training data for a scanning interval having a 2-second duration, and the scanner 145 would transmit twice as much scan data 150 than if the scanning interval were 4 seconds. This additional scan data 150 may then provide more training data, which in turn may lead to a more accurate mapping of the area of interest.

Further, the user in possession of the scanner 145 may cover as much unique space in the area of interest, that is to be mapped, as possible. Each room may be entered and circumnavigated in a manner that provides the greatest area coverage to obtain the most effective training data and/or data fitting, which can then be applied using the positioning algorithm In some examples, the training process may include requests for additional training data (e.g., scan data 150) by the machine learning model 125. For example, the machine learning model 125 may be capable of automatically request or observe scans every few seconds. The time between scans may be designated or modified by the server 110 or the machine learning model 125. Further, the time between scans may be varied, for example, to include scans every second, every 2 seconds, etc. During training, the scanner 145 sends the training data (e.g., scan data 150) to the server 110.

In some examples, training the machine learning model 125 may involve requests for additional training data (e.g., scan data 150). For example, the machine learning model 125 may send a request to the scanner 145. Such a request may include instructions to perform scans for a particular location, area of interest, or periodicity. Further, the time between scans may be varied, for example, to include scans every second, every 2 seconds, etc.

Once the server 110 receives the corpus of training data, the machine learning model 125 can use the corpus of training data (e.g., scan data 150) to train to determine fingerprints for different locations within areas of interest in a building. For example, the machine learning model 125 sorts the scan data 150 that is received from scanner 145 based on scans from the scanner 145, for example, as scanner 145 moves throughout a building. The machine learning model 125 can generate a map of the indoor location based on the signal strength readings contained within the scan data.

For instance, the machine learning model 125 can generate "fingerprints" for specific locations or areas of interest. The machine learning model 125 can do so by mapping these locations and/or areas of interest based on signal strength readings associated with the APs 120 that provide identifiable fingerprints. These fingerprints may include one or more parameters associated with the APs 120 that is mapped to a given location or area of interest (e.g., by MAC address). These locations may then be tied to a particular location on a floorplan, thus enabling the system to later determine a location on the floorplan based on a fingerprint match to scan data received from an electronic device.

For example, the one or more parameters for these fingerprints may include a range, hysteresis range, threshold value(s), etc. For example, a fingerprint that includes a hysteresis range may have signal strength readings that fall within uppermost and lowermost bounds of the range. In some examples, the fingerprint may include multiple hysteresis ranges that corresponds to single strength readings for both of a WiFi signal and a BLE beacon signal. Further, the one or more parameters may be correspond to one or more observable signal strength readings. In some examples, the parameters may statistically correlated to a combination of observable signal strength readings. Further, the parameters may include a combination of at least one WiFi signal strength reading and at least one BLE beacon signal strength reading.

In some examples, the machine learning model 125 can generate fingerprints for each of the locations corresponding to the areas of interest based on the training data (e.g., scan data 150). For example, training the machine learning model 125 may include applying statistical probabilities to the training data. In some examples, these statistical probabilities may correspond to a number of times that a WiFi signal or a BLE beacon was observed over a period of time.

For example, the machine learning model 125 may include a positioning algorithm that weights a probability that a device is in a particular location based on a highest number of times that observable signals (e.g., the WiFi signal or the BLE beacon) were detected over the duration of time. In one example, the machine learning model 125 may determine a high probability that the device is in a particular location or area of interest based on the number of observable signals over a five (5) second duration.

In this example, the machine learning model 125 includes a positioning algorithm that adds a weight to the number of observable signals. For instance, a high number of observable signals over such a duration may be weighted to reflect a strong statistical probability that the scanner 145 was in close relative physical proximity to a particular AP 120 when the training data (e.g., scan data 150) was obtained. In some examples, the machine learning model 125 may use timing information to weight scan data 150. For instance, the machine learning model 125 may add statistical weight to observable signals based on a consistency of signal strength readings over the duration. The machine learning model 125 can use such modelling to map APs 120, for example, by their corresponding MAC addresses, to various locations and areas of interest. In some examples, the machine learning model 125 may account for a consistency of signal strength readings over a duration.

In some examples, the machine learning model 125 may be trained to improve location results using parameters in addition to signal strength readings. For example, the machine learning model 125 may be trained using one or more physical characteristics of a building. For instance, the machine learning model 125 may identify patterns within the corpus of training data. In some examples, these patterns may correspond to one or more physical characteristics of the building. For example, the patterns may be derived from signal strength readings that are associated with locations in a floorplan map that has one or more physical barriers. In some examples, fingerprints include parameters associated with the APs 120. These parameters may include a range, hysteresis range, threshold value(s), etc. Further, the parameters may be statistically correlated to observed signal strength readings for WiFi scans, BLE beacons, or a combination of these.

Once trained, the server 110 can execute the machine learning model 125 to generate a location map having multiple fingerprints using the corpus of training data. For example, the machine learning model 125 can generate a location map that includes multiple fingerprints for various areas of interest in a building. In response to a request for location services, the machine learning model 125 can determine a specific location within the building using statistical probabilities. For instance, the machine learning model 125 can determine a probability that a position matches a fingerprint within the location map. To do so, the machine learning model 125 may use scan data 150 that is included in the request for location services.

In some examples, the scan data 150 may include a signal strength reading associated with a WiFi AP 120, a BLE beacon AP 120, or both. The machine learning model 125 may use a combination of a signal strength reading associated with a WiFi AP 120 and a BLE beacon AP 120 to determine a matching fingerprint in the location map. When a matching fingerprint is identified, the machine learning model 125 determines that the current position of the requesting device corresponds to the fingerprint. The machine learning model 125 retrieves the floorplan to identify an area of interest that corresponds to the location.

As described above, the machine learning model 125 may be trained to identify results corresponding to mapped locations and/or areas of interest by matching fingerprints. In this example, the machine learning model 125 can improve these results, for example, by filtering these results using the physical characteristics of a building. The machine learning model 125 may be trained to eliminate potential matching results (e.g., candidate fingerprints) based on threshold values associated with the physical characteristics of the building.

For example, the machine learning model 125 may identify a candidate fingerprint based on a strong observable signal strength reading that exceeds a predetermined minimum threshold value. The machine learning model 125 can retrieve the floorplan to identify physical characteristics of the building associated with the location. For instance, the machine learning model 125 may determine a presence of a multiple floors, a relative size of a room, a relative distance or spatial location of the AP 120 from which the observable signal was received, a proximity to a wall, a proximity to electrical devices, a line of sight, a signal propagation characteristics, etc. The machine learning model 125 can use these physical characteristics to rule out locations that may have candidate fingerprints but could not be realistic matches, for example, because it would put the device in physically impossible locations.

One example of a physical characteristic that can be used to rule out an improbable location is a physical distance. For example, a physical distance can be used by the machine learning model 125 to rule out a location that is too remote from the scanner 145 but would otherwise be a potential match for a candidate fingerprint corresponding to an observable signal from an AP 120 associated with that particular location. For example, the machine learning model 125 may determine the candidate fingerprint corresponds to a location on a first floor of a building. But the machine learning model 125 may determine that the AP 120 is located on a second floor of the building, for example, based on MAC address of the AP 120. In response, the machine learning model 125 can eliminate the apparent match based on the relative location of the AP 120.

In some examples, the machine learning model 125 may eliminate fingerprints based on an effective range of an AP 120, which may not necessarily correspond to an actual range. The machine learning model 125 may discard the candidate fingerprint match despite receiving an observable signal strength reading. For example, the machine learning model 125 may determine that the observable signal corresponds to a location that is distant, for example, based on the effective range associated with that AP 120. In response, the machine learning model 125 can eliminate that location as a potential location of the scanner 145 based on the observable signal being beyond the effective range. Similarly, the machine learning model 125 can use physical barriers such as interior or exterior walls to rule out other candidate fingerprints. Further, the machine learning model 125 may also use a location history (e.g., one or more last known locations) to rule out certain candidate fingerprints.

Further, the machine learning model 125 can generate display information (e.g., a GUI, graphical representation, or virtual representation, etc.) that includes the location information associated with the fingerprint. The machine learning model 125 can send the display information to the requesting device (e.g., client device 115). In some examples, the display information may include a map, label, or one or more network capabilities, etc. For instance, the display information may include a listing of available network connections. In some examples, the display information can include an indication of a dead zone (e.g., an image, symbol, or textual information).

In addition, the server 110 includes a location services API 130. The server 110 uses the location services API 130 to provide the client device 115 with an API that provides location functions in a location services application. The location services API 130 can enable a number of functions such as sending and receiving location data, identifying a position, retrieving fingerprint information, labelling locations, other functions, etc., or a combination of these. The client device 115 can use the location services API 130 in the location services application to send or receive location information from the server 110. For instance, the client device 115 can receive a current location from the server 110 via the location services API 130. In some examples, the client device 115 can use the location services application to send a user input (e.g., touch input, voice command, gesture, etc.) that includes a request to label or re-label a particular area of interest.

Further, the server 110 includes a messaging API 135. In this example, the server 110 uses the messaging API 135 to provide the client device 115 with an API that integrates messaging functions into the location services application. Messaging APIs 135 (e.g., SMS APIs, MMS APIs, representational state transfer ("REST") APIs, etc.) can enable a number of functions such as sending and receiving user information, SOS messages, notifications, text, pictures, audio, videos, software updates, other functions, etc., or a combination of these. The client device 115 can use a messaging API 135 in the location services application to send information to the server 110. For instance, the client device 115 can send labels 155, such as those described above, to the server 110 via the messaging API 135.

In one example, the client device 115 includes the location services application that is accessible by a user. In some examples, the user can access the location services application to perform scanning functions. For instance, the client device 115 may include a microphone that allows the user to enter a user input verbally. The user can provide the user input in the location services application, for example, that includes a voice command to obtain a current location. In response to the user input, the client device 115 transmits a request for location services for its current location to the server 110. The request may include information such as observable signal strength readings for one or more nearby APs 120.

In this example, the machine learning model 125 identifies a matching fingerprint and the current position of the requesting client device 115. The trained machine learning model 125 sends the current position to the requesting client device 115. For example, the machine learning model 125 can send a text message that includes the position of the requesting client device 115 that reads "Office #307." In another example, the machine learning model 125 can send an audio message that uses a voice assistant, for example, upon opening the message, which reads "Your current location is in Office #307." In some examples, the machine learning model 125 generates display information that includes location information associated with the fingerprint. The machine learning model 125 can send the display information to the requesting client device 115. In some examples, server 110 may send the display information to the client device 115 using location services API 130 or messaging API 135.

In some examples, the location services application may include a user interface (e.g., a GUI) that enables user inputs to change certain location settings. For example, a user may use a microphone in the client device 115 to input the voice command "create location" in the location services application. The "create location" function may allow a user to create a label (e.g., a label 155) or description that is associated with a particular area of interest that is identified by the user. The location services application may also include an ability to create a list of locations, for example, which can be sorted and/or organized numerically (e.g., room 124, 125, 126, etc.) or by type (e.g., offices, restrooms, hallways, or by floors within a building, etc.).

Further, the location services application may provide these capabilities via a visual user interface (e.g., a GUI), gestures (e.g., using a camera), touch inputs (e.g., via a keypress or touch screen), or audible commands (e.g., using a microphone), or a combination of these. In some examples, the location services application may also include an ability to create a new location, modify a location, label or name an area of interest, designate a sub-location in an area of interest (e.g., a bifurcated office space), change other location settings, etc.

For example, a user may add a new device (e.g., a new AP 120) to an existing network. The new device may include a user-generated location name. For example, a user may use the location services application to access a microphone in client device 115 and to input a voice command "pair beacon with [location name]." In response, the location services application may cause the client device 115 to generate and send a label 155 (e.g., with the user-generated location name) to the server 110. In some examples, server 110 receives the label 155 and pairs the new device (e.g., the beacon) by assigning the location name to the area of interest associated with the beacon.

In some examples, the location services application includes access to location information stored in a cloud network. For example, an authorized user may be able to access past scan data 150 stored in the cloud via the location services application. In some examples, the location services application can access a cloud computing device (e.g., server 110) to retrieve scan data 150. In one example, the client device 115 may download location information, such as fingerprints, scan data 150, labels 155, etc., from the cloud (e.g., via location database 140). Further, in some examples, the client device 115 may download location information (e.g., a user's location history) to the cloud.

In one example, the server 110 can receive a user request for location services within a building. For example, the server 110 receives the request for locations services from the client device 115 via the messaging API 135. The server 110 can execute the trained machine learning model 125 to identify the location of the client device 115, for example, using fingerprints associated with an area of interest corresponding to the current location information. Further, the machine learning model 125 can determine a matching fingerprint associated with the area of interest. The machine learning model 125 sends the matching fingerprint to the location services API 130.

In this example, the location services API 130 can generate a graphical representation of the location or area of interest associated with the matching fingerprint and display an indicator to show the determined position of the device. In some examples, the graphical representation may include a label 155, floorplan, avatar, or another graphical feature associated with the area of interest. The location services API 130 sends the graphical representation of the location to the messaging API 135.

Continuing with this example, the server 110 can send a message to the client device 115 that includes the identified location. For example, the server 110 can send the message using the messaging API 135. Further, the message may include the graphical representation or an image of the identified location. The floorplan and the identified location may be rendered on any device having a screen and the graphical processing ability to render the message. For example, the floorplan may be rendered on the client device 115. In some examples, the floorplan may be requested by, and rendered on, the scanner 145.

In another example, a requesting device (e.g., client device 115) may seek the location of a target device (e.g., scanner 145). For instance, a supervisor in possession of the client device 115 may wish to locate a particular employee that she knows is carrying the target device, scanner 145. The supervisor can enter a user input, via the client device 115, that sends a location request to the server 110 with a request for the current location of the target device, scanner 145. The server 110 may process the request to determine the target device's location using any of the techniques described herein. The server 110 sends the current location to the client device 115.

The current location of the target device, scanner 145, may then be returned to the client device 115 in any number of formats. For example, the location may be returned verbally, as an audio notification that includes the current location. In another example, the current location may be sent to the client device 115 as a text notification. In other examples, the location may be sent to the client device 115 as a graphical representation, for example, that includes a map of the floorplan and/or geofenced location. Further, the graphical representation may include an icon associated with the target device positioned relative to its current location within the floorplan and/or geofenced location.

Figure 2:
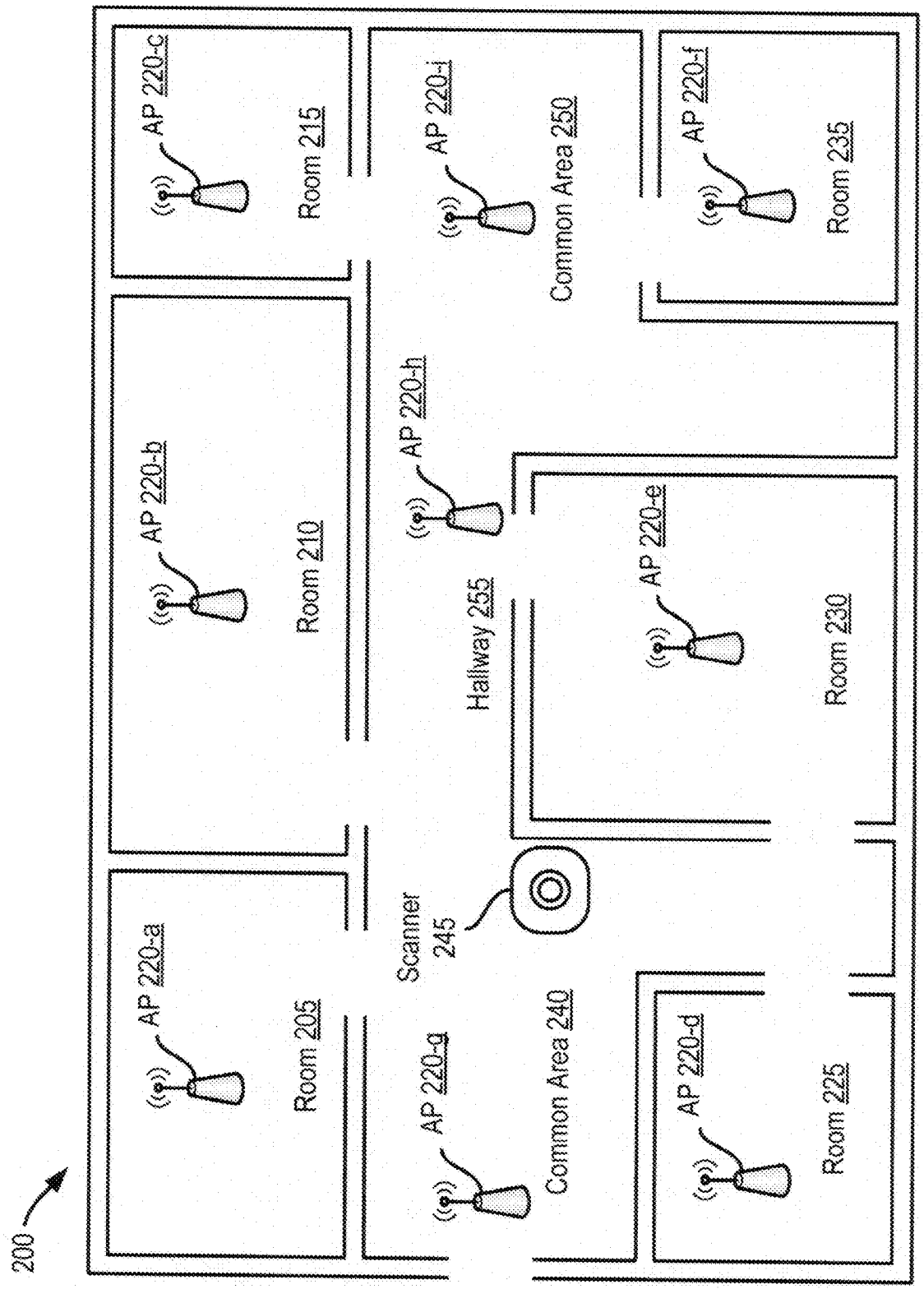
FIG. 2 shows a set of access points relative to an example floorplan for training purposes according to this disclosure.

FIG. 2 shows a set of APs 220 relative to an example floorplan 200 for training purposes according to certain aspects of this disclosure. For example, the floorplan 200 is a computer-generated floorplan that corresponds to a floor in a building and depicts various areas of interest. In this example, the areas of interest have been pre-defined to cover the floorplan 200 shown in FIG. 2. However, in some examples, a user may designate the areas of interest, for example, using a messaging API or a location services API. In this example, each room 205-215, 225-255 includes its own AP 220. In addition, a scanner 245, which may be a client device, is depicted as being positioned within the floor plan. Each of the APs 220 and scanner 245 may include any or all of their respective features described herein and with respect to like devices, for example, as described above in FIG. 1.

The floorplan 200 includes pre-defined label data identifying specific rooms and/or locations within the floorplan. For instance, the floorplan 200 includes representations of six (6) different rooms 205, 210, 215, 225, 230, and 235 and a single main hallway 255 that has been subdivided into three sub-areas, including common areas 240 and 250. Each room may represent an office, a conference room, a breakroom, a restroom, etc. Further, each room 205-215, 225-255 includes its own label.

For example, the rooms 205, 215, 225, and 235 may all be offices and may include labels "Office 1," "Office 2," "Office 3," and "Office 4," respectively. Similarly, the rooms 210 and 230 may be conference rooms that are labeled "Conference Room A" and "Conference Room B," respectively. Additionally, the floorplan 200 includes common areas 240, 250, and a hallway 255, may be labeled (e.g., by user-defined labels 155) as "East Commons," "West Commons," and "Hallway," respectively. In some examples, the labels may be computer-generated. But in other examples, the labels may be customizable. For example, the labels may be assigned based on a received user input from a client device or the scanner 245. Further, the labels may be modified based on a user input via a location services application.

In some examples, the scanner 245 may be utilized to collect location information (e.g., corresponding to RSSI or other signal strength readings) for the locations of interest (e.g., rooms) throughout the floorplan 200. Further, the scanner 245 may send the collected location information to a server (e.g., server 110) or a machine learning model (e.g., machine learning model 125). Such location information may be utilized as training data for the machine learning model. In other examples, the scanner 245 may be a target device that is requesting location services.

In some examples, the server can send a message to the scanner 245 that includes the identified location. For example, the identified location may be a room within a floorplan. In other examples, the location may be a pinpoint location that includes a portion or section of a room or a precise lat/long coordinate location. And in some examples, the server can send the message using a messaging API. Further, the message may include a graphical representation or an image of the identified location. The floorplan 200 and the identified location may be rendered on any device having a screen and the graphical processing ability to render the message. For example, the floorplan 200 may be rendered on a client device, such as client device 115.

While a single floor has been illustrated as the floorplan 200 (e.g., having multiple areas of interest), many areas of interest encompass multiple floors within a building. The techniques described herein are not limited to just a single floor. Often times, a wireless device may detect an observable signal from known APs 220 located on other floors. These APs 220 may also be used when training, and ultimately, when determining a position of a device. For example, the machine learning model may be able to predict a user's location using fingerprints that correspond to an area of interest without an exact geo-coordinate location of a MAC address for an AP.

In addition to being represented as a set of room names or labels, floorplan 200 could be represented in a server (e.g., server 110) as a digital image. Such a digital image may allow the server to determine a more precise coordinate location. For instance, the coordinate system may be overlaid onto or otherwise associated with the image and may be an (x, y, z) coordinate system, a latitude and longitude (lat/long) coordinate system, or any other coordinate system known to or referenced by a mapping and positioning algorithm. Further, the digital image may also be geo-referenced (e.g., geo-tagged), such that a coordinate location within that image could be translated to a geographic location represented in terms of latitude, longitude, and elevation.

Figure 3:
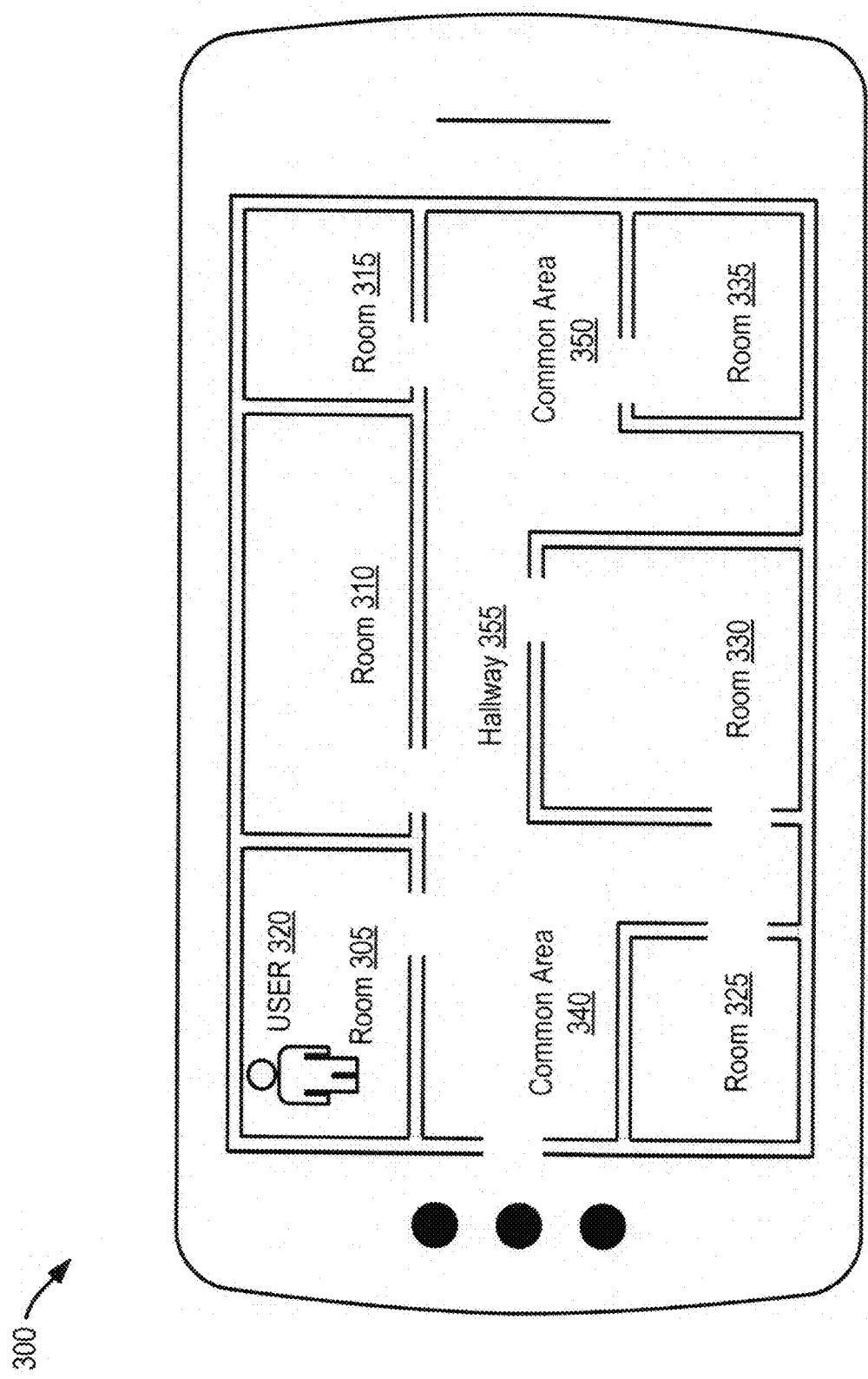
FIG. 3 shows an example of a graphical representation for a floorplan according to this disclosure.

FIG. 3 shows an example of a graphical representation 300 for an example floorplan according to certain aspects of this disclosure. The graphical representation 300 includes a floorplan that is similar to the floorplan 200, depicted in FIG. 2. Further, the graphical representation 300 shows the floorplan that includes six (6) different rooms 305, 310, 315, 325, 330, and 335 and a single main hallway 355 that has been subdivided into three sub-areas, including common areas 340 and 350. Each room 305-315, 325-355 includes its own label. For example, rooms 305, 315, 325, and 335 may be labeled "Office 1," "Office 2," "Office 3," and "Office 4,"

respectively. Rooms 310, 330 may be labeled "Conference Room A" and "Conference Room B," respectively. And common areas 240, 250, and hallway 255 may be labeled "East Commons," "West Commons," and "Hallway," respectively. In some examples, graphical representation 300 may be generated using any of the techniques described herein.

The example graphical representation 300 also includes a user 320. In this example, the graphical representation of a user 320 may be an avatar for a user. For example, the graphical representation 300 may be generated in response to a user request for location services. In one example, the user request may correspond to a user input in a location services application that is being executed in a client device (e.g., client device 115). In response to the request, a server (e.g., server 110) generates and sends the graphical representation 300 to the client device.

In this example, the client device is a smartphone that displays the graphical representation 300, for example, via the location services application. Further, in this example, the server determines based on observable signals accompanying the request for location services that the client device is present in room 305. Thus, the server generates the graphical representation 300 that depicts the user 320 as having a current location within room 305. In some examples, the graphical representation 300 may include the label corresponding to room 305 (e.g., "Office 1").

Figure 4:
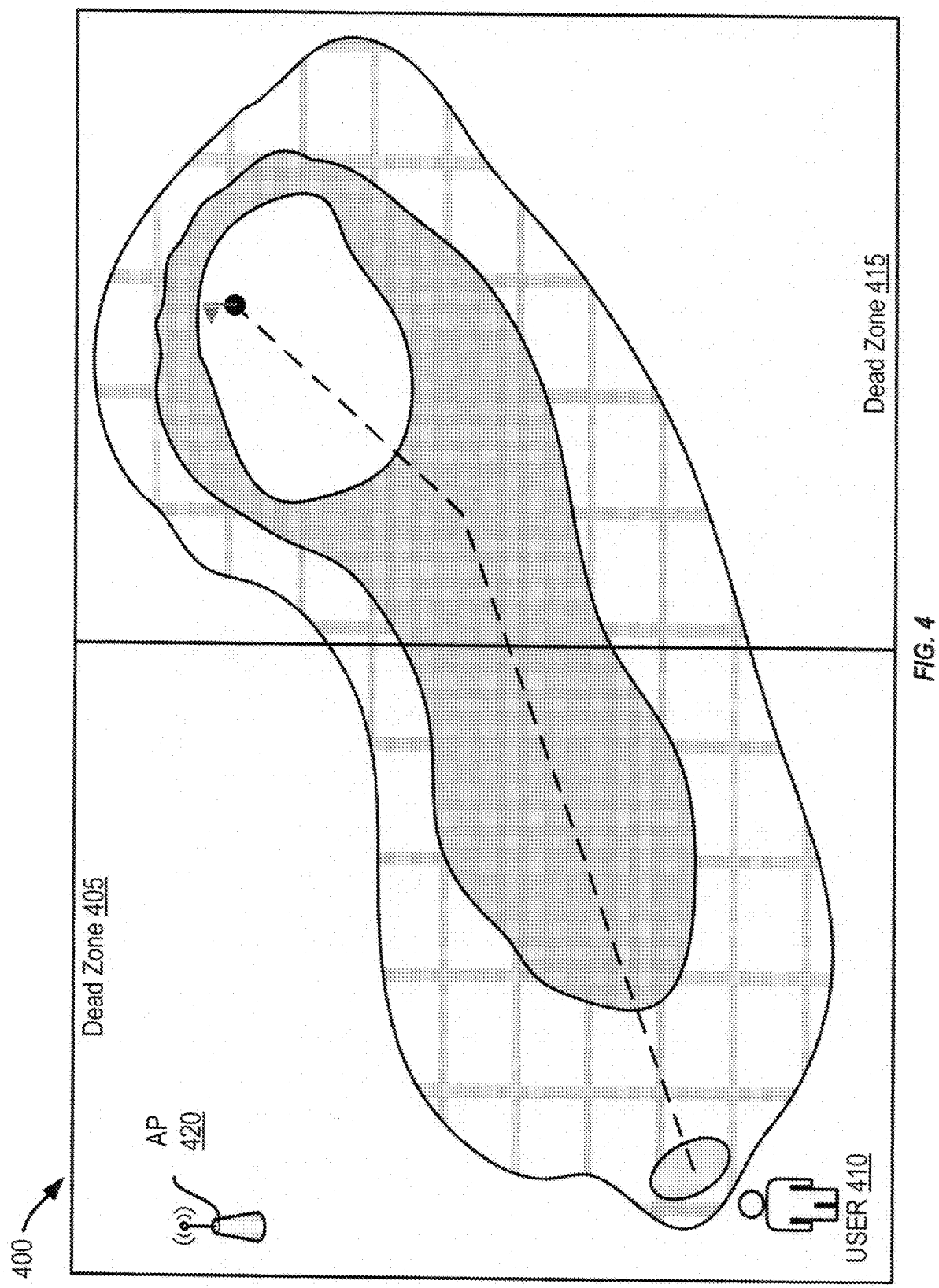
FIG. 4 shows an access point relative to an example geofenced location according to this disclosure.

FIG. 4 shows an access point relative to an example geofenced location 400 according to certain aspects of this disclosure. In some examples, the steps shown in FIG. 4 may be implemented in program code that is executable by a computing device, for example, the server 110 or a processor in a general-purpose computer or server. In some embodiments, one or more steps shown in FIG. 4 may be omitted or performed in a different order. Similarly, additional steps not shown in FIG. 4 may also be performed. For illustrative purposes, the steps of the method 400 are described below with reference to components described above with regard to the positioning system 100 shown in FIG. 1, but any suitable system according to this disclosure may be employed.

The geofenced location 400 may include one or more virtual boundaries. For instance, the geofenced location 400 includes a par 4 golf hole that is a part of a larger golf course. In this example, the geofenced location 400 depicts the par 4 golf hole that is substantially bifurcated into two geofenced areas, dead zones 405, 415. The dead zones 405, 415 are defined by the substantially circumscribing rectangular lines. In some examples, the dead zones 405, 415 may include one or more labels. For instance, the dead zone 405 may include a user-assigned label "Hole 9 Tee Box." similarly, the dead zone 415 may be labeled "Hole 9 Fairway and Green." In this example, the dead zone 405 includes an AP 420. In some examples, the dead zones 405, 415 may include different types of network availabilities.

For example, the user 410 may be in possession of a client device (e.g., client device 115). As the user 410 approaches the tee box of the par 4 golf hole, the user 410 may notice a loss of network connectivity while using the client device 115 (e.g., a smartphone). In one example, the user 410 access the location services application via client device 115. The user 410 requests location services via the application, for example, to determine whether his/her/their current position corresponds to a dead zone. In some examples, the client device 115 may automatically request location services. For example, the client device 115 may detect a loss of a type of network connectivity, and in response, the client device 115 can request its current position. In some examples, the client device 115 may retrieve data from a lookup table that includes a list of dead zones from server 110. In response to determining the location is in a dead zone 405, the client device 115 may change a state of the client device 115 to access an available network resource (e.g., AP 420).

In response to the request from the client device 115, the positioning system 100 determines the current position of the client device 115. For example, the positioning system 100 can use server 110 to execute a trained machine learning model 125 to determine the current position of the client device 115. The server 110 determines the current position of the user 410 (in possession of the client device 115) is in dead zone 405. Based on the determination that current position is in a dead zone, the server 110 sends a control message to the client device 115 to change a state of the smartphone. In some examples, server 110 sends a control signal that causes the client device 115 to change the state of the smartphone (e.g., a type of network connectivity).

For instance, as the user 410 enters the dead zone 405, the server 110 may receive a location service request from the client device 115 that includes a signal strength reading from AP 420. The server 110 may determine that a presence of the AP 420 indicates that the dead zone 405 includes good Wi-Fi coverage. In some examples, the server 110 determines the dead zone 405 includes good Wi-Fi coverage based on data associated with the geofenced region indicating high signal strength for a Wi-Fi AP (e.g., AP 420). In some examples, the server 110 determines that the dead zone 405 includes good Wi-Fi coverage based on one or more parameters associated with AP 420 (e.g., using the signal strength reading from AP 420). In response to the determination that dead zone 405 includes good Wi-Fi coverage, server 110 sends a control signal to the client device 115 that causes a state change. For instance, the control signal may cause a state change to the type of network connectivity. In one example, the control signal may change the type of network connectivity from a "Cellular Service" mode to a "Wi-Fi" mode or "Prefer Wi-Fi" mode.

In this example, the user 410 enters the dead zone 415 after hitting his/her/their tee shot. The server 110 receives another location service request from the client device 115 that includes a signal strength reading from AP 420. The server 110 may determine that the dead zone 415 includes a "fringe" Wi-Fi area that has unreliable Wi-Fi coverage and/or availability. In response, the server 110 may send a control signal to the client device 115 that causes a state change to the type of network connectivity. For example, the control signal may cause a state change of the client device 115 from a "Wi-Fi" mode to a "Cellular Service Only" mode. In another example, the client device 115 may be a multi-SIM-device. The server 110 may determine that the dead zone 415 includes better cellular service and/or coverage for a particular provider. Thus, the server 110 may send a control signal that causes the client device 115 to switch from a "SIM1" to a "SIM2," causing the client device 115 to switch cellular network providers.

The server 110 sends a control signal that can alter the state of the client device 115 in a number of ways. In some examples, changing the state of the client device 115 may include changing a type of network service. For example, changing the state can include switching networks belonging to a cellular service provider, a Wi-Fi network, or a P2P network. The control signal may also cause an alteration that includes a change from one AP to another within a connected network (e.g., from a Wi-Fi AP to a BLE AP or vice-versa). Further, altering the state of the client device 115 can include enabling or disabling a radio, a modem, or a service in the client device 115. It should be appreciated that the state change may include a change to any type of network connectivity that the client device 115 is capable.

Figure 5:
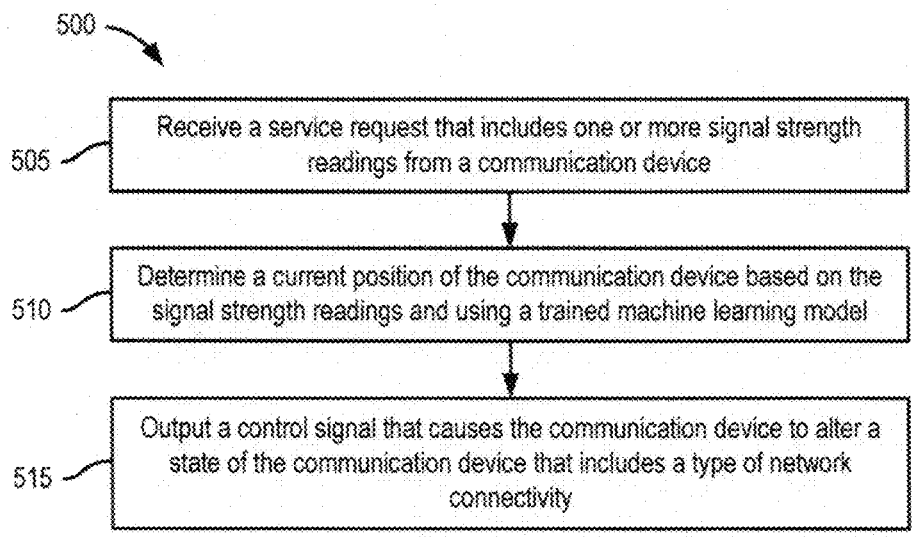
FIG. 5 shows an example method for determining positioning for a dead zone using a trained machine learning model according to this disclosure.

FIG. 5 shows an example of a method 500 for determining positioning for a given location in an area of interest according to certain aspects of this disclosure. In some examples, the steps shown in FIG. 5 may be implemented in program code that is executable by a computing device, for example, the server 110 or a processor in a general-purpose computer or server. In some embodiments, one or more steps shown in FIG. 5 may be omitted or performed in a different order. Similarly, additional steps not shown in FIG. 5 may also be performed. For illustrative purposes, the steps of the method 500 are described below with reference to components described above with regard to the system 100 shown in FIG. 1, but any suitable system according to this disclosure may be employed.

The method 500 begins at block 505, the positioning system (e.g., positioning system 100) receives a service request that includes one or more signal strength readings from a communication device (e.g., scanner 145 or client device 115). For example, the positioning system 100 receives a service request that includes scan data (e.g., scan data 150) from the client device 115 that includes observed signals from one or more APs (e.g., APs 120). Further, a user in possession of the client device 115 input the service request using the location services application. In some examples, the scan data 150 include signal information that is obtained from the one or more APs 120 according to any of the techniques described herein.

At block 510, the positioning system 100 determines a current position of the communication device (e.g., client device 115) based on the signal strength readings. In this example, the positioning system 100 uses the server 110 to execute the trained machine learning model 125. The machine learning model 125 determines the current position, for example, using signal strength readings from scan data 150. In some examples, the machine learning model 125 can determine the current position of the client device 115 according to any of the techniques described herein. In this example, the server 110 determines the current position of the client device is in a dead zone (e.g., dead zone 405 or 415). For example, the server 110 execute the trained machine learning model 125 to determine the current position of the client device 115 using the signal strength readings included in the service request from block 505.

At block 515, the positioning system 100 outputs a control signal that causes the communication device (e.g., client device 115) to alter a state of the communication device that includes a source or type of network connectivity. For instance, the server 110 may determine that the current position of the client device, in the dead zone, includes an availability of a particular source or type of network connectivity. In response, the server 110 sends the control signal to cause the client device 115 to change the type of network connectivity. For instance, the server 110 can determine that the dead zone includes Wi-Fi coverage and send a control signal to the client device 115 that causes a state change to the source or type of network connectivity. In another example, the control signal may change the type of network connectivity from a cellular service provider to access the Wi-Fi network. In another example, the control signal may change the source or type of network connectivity from one cellular service provider to another cellular service provider.

In some examples, the server 110 determines a lack of a source or type of network connectivity. For example, the server 110 can use a signal strength reading that is included with the request from block 505 to determine the lack of one or more sources or types of network connectivity. The server 110 may determine that the dead zone includes a Wi-Fi area that is associated with a particular fingerprint. Further, the server 110 can use the Wi-Fi data for that particular fingerprint to determine a lack of Wi-Fi coverage. In response, the server 110 may send a control signal to the client device 115 that causes a state change to the source or type of network connectivity, for example, from a previously-connected Wi-Fi network to an available cellular network. In another example, the server 110 may transmit a control signal that causes a state change to the client device 115 that includes a multi-SIM-device. For instance, the server 110 may send a control signal that causes the client device 115 to switch from a "SIM1" to a "SIM2," causing the client device 115 to switch from one cellular network to another. In some examples, the server 110 may also send a control signal to disable a radio associated with "SIM1," thereby reducing power consumption by the client device.

In one example, the server 110 determines a presence or availability of a P2P network connection. For instance, the current position of the client device 115 may be in an indoor location, such as a floor of a building. The server 110 may determine that the current position is associated with a fingerprint that includes a dead zone that lacks sufficient cellular or Wi-Fi coverage. In this example, the server 110 can send a control signal that causes a state change to the client device 115, enabling access to the P2P network. In some examples, accessing the P2P network, by the client device 115, may allow the client device 115 to communicate directly with one or more remote computing devices. Further, the P2P connection may allow the client device 115 to control and/or execute desired functions on one or more remote computing devices to perform backhaul computations.

Figure 6:
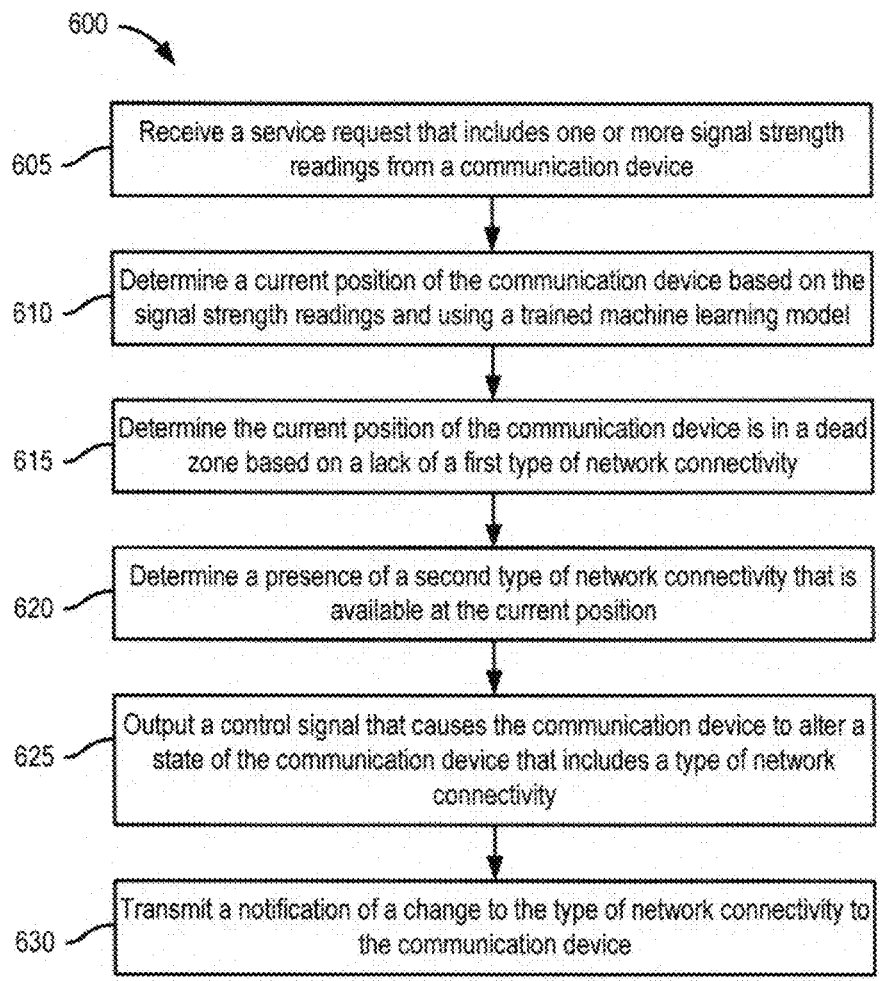
FIG. 6 shows another example method for determining positioning for a dead zone using a trained machine learning model according to this disclosure.

FIG. 6 shows an example of a method 600 for determining positioning for a given location in an area of interest according to certain aspects of this disclosure. In some examples, the steps shown in FIG. 6 may be implemented in program code that is executable by a computing device, for example, the server 110, client device 115, or a processor in a general-purpose computer or server. In some embodiments, one or more steps shown in FIG. 6 may be omitted or performed in a different order. Similarly, additional steps not shown in FIG. 6 may also be performed. For illustrative purposes, the steps of the method 600 are described below with reference to components described above with regard to the system 100 shown in FIG. 1, but any suitable system according to this disclosure may be employed.

The method 600 begins at block 605, when the positioning system (e.g., positioning system 100) receives a service request that includes one or more signal strength readings from a communication device (e.g., scanner 145 or client device 115). For instance, the positioning system 100 can receive the service request in a substantially similar manner as described above, with respect to block 505 of FIG. 5. In some examples, the positioning system 100 may receive the service request according to any of the techniques described herein.

At block 610, the positioning system 100 determines a current position of the communication device (e.g., client device 115) based on the signal strength readings. The positioning system 100 determines a current position of the communication device using a trained machine learning model (e.g., machine learning model 125). For instance, the positioning system 100 can determine the current position of the client device 115 in a similar manner as described above, with respect to block 510 of FIG. 5. In some examples, the positioning system 100 may determine the current position of the client device 115 according to any of the techniques described herein.

At block 615, the positioning system 100 determines the current position of the communication device (e.g., client device 115) is in a dead zone based on a lack of a first type of network connectivity. For instance, the server 110 may determine the lack of a first source or type of network connectivity, such as a cellular, Wi-Fi, P2P network connectivity, or another suitable source or type of network connectivity, etc. The server 110 can use a signal strength reading that is included with the request from block 605 to determine the lack of the first source or type of network connectivity. In some examples, the server 110 determines the current position is in the dead zone according to any of the techniques described herein. In other examples, the server 110 may not need to determine that the client device 115 is in a dead zone. For example, the service request from block 605 may include a message, notification, or another suitable indication that the client device 115 is experiencing a lack of network connectivity (e.g., is present in a dead zone).

At block 620, the positioning system 100 determines a presence of a second source or type of network connectivity that is available at the current position. For example, the server 110 can determine an availability of the second source or type of network connectivity that is associated with the current position. The server 110 can use a signal strength reading that is included with the request from block 605 to determine a presence of the second source or type of network connectivity. In some examples, the server 110 may determine the availability of the second source or type of network connectivity according to any of the techniques described herein.

At block 625, the positioning system 100 outputs a control signal that causes the communication device (e.g., client device 115) to alter a state of the communication device that includes a source or type of network connectivity. For instance, the positioning system 100 can output a control signal that causes the client device 115 to alter the state of the client device 115 in a substantially similar manner as described above, with respect to block 515 of FIG. 5. In some examples, the positioning system 100 may output the control signal according to any of the techniques described herein.

At block 630, the positioning system 100 transmits a notification of a change to the source or type of network connectivity to the communication device (e.g., client device 115). For example, the server 110 can transmit the notification to the client device 115 that indicates the change to the source or type of network connectivity from block 625. The server 110 can send the notification to the client device 115, for example, using the available network connectivity. In some examples, the server 110 sends the notification of the change with the requested location from block 605. Further, the notification may include any suitable type of notification (e.g., textual information, SMS, MMS, an image, audio alert, tactile feedback, etc.).

For example, the notification may be returned to the client device 115 as an audio notification that includes the current location, location information, dead zone, available networks, etc. In one example, the audio notification includes a text-to-speech ("TTS") message. In other examples, the notification may be sent to the client device 115 as a text notification. In yet other examples, the notification may be sent to the client device 115 as a graphical representation, for example, that includes a map of the floorplan and/or geofenced location. Further, the graphical representation may include an icon associated with the client device 115 positioned relative to its current location within the floorplan and/or geofenced location.

Although the above operations are described sequentially, many of the operations can be performed in parallel or concurrently. In addition, the order of the operations may be rearranged. A process may have additional steps not included in the FIGS. 5-6. Furthermore, examples of the methods may be implemented by hardware, software, firmware, middleware, microcode, hardware description languages, or any combination thereof. When implemented in software, firmware, middleware, or microcode, the program code or code message segments to perform the necessary tasks may be stored in a non-transitory computer-readable medium such as a storage medium. Processors may perform the described tasks.

Figure 7:
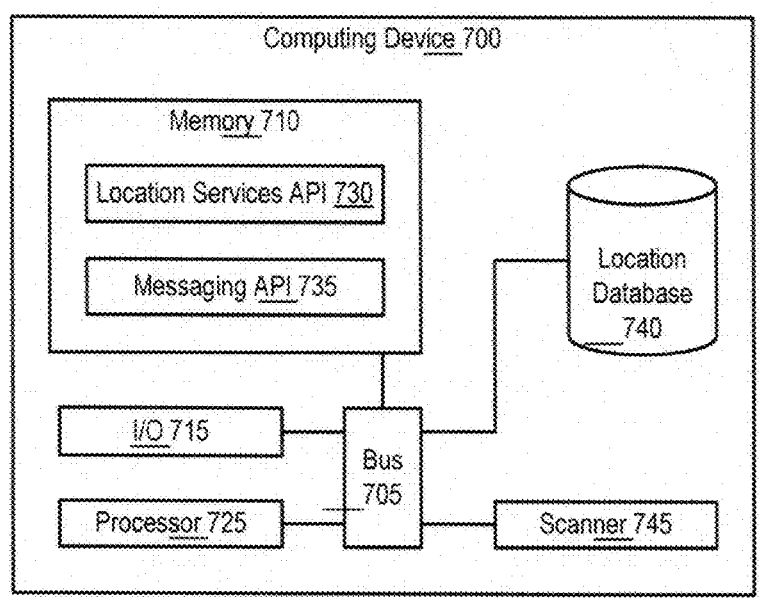
FIG. 7 an example computing device suitable for use with example systems for positioning according to this disclosure.

FIG. 7 an example computing device suitable for use with example systems for positioning according to certain aspects of this disclosure. The example computing device 700 may be, for example, any of the server 110, a computer, or any other type of suitable computing device. In some examples, the computing device 700 can be any suitable computing device for receiving and sending messages according to the techniques described herein.

The computing device 700 includes a processor 725 communicatively coupled to other hardware via a bus 705. The processor 725 can include one or more commercially available processors, embedded processors, secure processors, microprocessors, dual microprocessors, multi-core processors, other multi-processor architectures, another suitable processing device, or any combination of these. A memory 710, which can be any suitable tangible (and non-transitory) computer-readable medium such as random access memory ("RAM"), read-only memory ("ROM"), erasable and electronically programmable read-only memory ("EEPROMs"), or the like, embodies program components that configure operation of the computing device 700. In the embodiment shown, computing device 700 further includes a location database 740, which may include any or all of its respective features described herein. The computing device 700 also includes one or more input/output ("I/O") interface components 715.

I/O components 715 can include one or more network interface devices or any components that facilitate a network connection. Examples include, but are not limited to, gateways, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, GPRS, EDGE, EV-DO, SVDO, UMTS, HSDPA, HSUPA, HSPA+, LTE, LTE Advanced, VoLTE, 5G, 5G NR, WiMAX, Wi-Fi, or other mobile communications network).

I/O components 715 can facilitate wired or wireless connections to devices such as one or more displays, game controllers, keyboards, mice, joysticks, cameras, buttons, speakers, microphones and/or other hardware used to input or output data. Memory 710 represents nonvolatile storages such as magnetic, optical, or other storage media included in computing device 700 and/or coupled to processor 725.

In some embodiments, the computing device 700 includes a location database 740. The location database 740 may include information related to observable location data or particular signal strength readings associated with the computing device 700. For example, location database 740 may include fingerprint data that corresponds to particular areas of interest mapped by the computing device 700.

In some examples, the processor 725 may execute program code or instructions stored in memory 710 (e.g., location services API 730 or messaging API 735). In some examples, the processor 725 may execute program code or instructions for the location services API 730 or messaging API 735 stored in memory 710.

It should be appreciated that computing device 700 may also include additional processors, additional storage, and a computer-readable medium (not shown). The processor(s) 725 may execute additional computer-executable program instructions stored in memory 710. Such processors may include a microprocessor, digital signal processor, application-specific integrated circuit, field programmable gate arrays ("FPGAs"), programmable interrupt controllers, programmable logic devices, programmable read-only memories, electronically programmable read-only memories, or other similar devices.

Certain aspects and features of the present disclosure involve systems capable of providing SOS call routing for emergency calls in a communications network with which a user may send or receive message. The methods, devices, and systems described above are examples. Various configurations may omit, substitute, or add various procedures or components. For example, in alternative configurations, the methods may be performed in a different order. In another example, the methods may be performed with fewer steps, more steps, or in combination. In addition, certain configurations may be combined in various configurations. As technology evolves, many of the elements are examples and do not limit the scope of the disclosure or claims.

While some examples of methods, devices, and systems herein are described in terms of software executing on various machines, the methods and systems may also be implemented as specifically-configured hardware, such as a FPGA specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a RAM coupled to the processor. The processor executes computer-executable program instructions stored in memory, such as executing one or more computer programs. Such processors may comprise a microprocessor, a digital signal processor ("DSP"), an application-specific integrated circuit ("ASIC"), FPGAs, and state machines. Such processors may further comprise programmable electronic devices such as PLCs, programmable interrupt controllers ("PICs"), programmable logic devices ("PLDs"), programmable read-only memories ("PROMs"), electronically programmable read-only memories ("EPROMs" or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

That which is claimed is:

1. A computing system comprising:
   a non-transitory computer-readable medium; and
   a processor in communication with the non-transitory computer-readable medium, the processor configured to execute instructions stored in the non-transitory computer-readable medium to:
   receive a service request from a communication device, the service request comprising one or more signal strength readings associated with a current position of the communication device;
determine, using a trained machine learning model, the current position corresponds to a fingerprint within a location map based on the one or more signal strength readings; and
output a control signal configured to cause the communication device to alter a state of the communication device based on location information associated with the fingerprint, wherein the state of the communication device comprises a source or type of network connectivity, wherein the one or more signal strength readings are a first signal strength reading, wherein the current position is a first position, wherein the fingerprint is a first fingerprint, wherein the location information associated with the first fingerprint is first location information, wherein the control signal is a first control signal, and the processor further configured to execute instructions stored in the non-transitory computer-readable medium to:
receive a second signal strength reading from the communication device;
determine, using the trained machine learning model, a second position that corresponds to a second fingerprint; and
output a second control signal configured to cause the communication device to alter the source or type of network connectivity of the communication device based on second location information associated with the second fingerprint.

2. The computing system of claim 1, wherein the current position is at least one of an indoor location or a geofenced location.

3. The computing system of claim 1, wherein the computing system is at least one of a server or is integrated within the communication device.

4. The computing system of claim 1, wherein the type of network connectivity is at least one of a cellular service, a Wi-Fi service, or a point-to-point (P2P) connection.

5. The computing system of claim 1, wherein the control signal is configured to cause the communication device to alter the state of the communication device by switching from a first subscriber identification module (SIM) card to a second SIM card.

6. The computing system of claim 1, wherein the control signal is configured to cause the communication device to alter the state of the communication device by changing at least one of a service provider, a Wi-Fi network, a Wi-Fi access point ("AP"), SIM card, or a P2P connection.

7. The computing system of claim 1, wherein the control signal is configured to cause the communication device to alter the state of the communication device by enabling or disabling at least one of a radio, a modem, or a service in the communication device.

8. The computing system of claim 1, wherein the control signal is configured to cause the communication device to alter the state of the communication device based in part on at least one of a user preference for a cellular mode or a Wi-Fi mode.

9. The computing system of claim 1, wherein the location information associated with the fingerprint indicates either of: (i) a lack of a particular source or type of network connectivity or (ii) a presence of a particular source or type of network connectivity.

10. The computing system of claim 1, wherein the one or more signal strength readings are a first signal strength reading, wherein the current position is a first position, wherein the fingerprint is a first fingerprint, wherein the location information associated with the first fingerprint is first location information, wherein the control signal is a first control signal, and the processor further configured to execute instructions stored in the non-transitory computer-readable medium to:
in response to a determination of a lack of cellular network connectivity and Wi-Fi network connectivity, output a second control signal configured to cause the communication device to establish a P2P connection with a remote computing device.

11. The computing system of claim 1, wherein the communication device comprises a client device, and the processor further configured to execute instructions stored in the non-transitory computer-readable medium to:
transmit the location information associated with the fingerprint to the client device, wherein the location information is configured to cause the client device to display a graphical user interface (GUI) that includes a notification of a change to the source or type of network connectivity of the communication device.

12. The computing system of claim 1, the processor further configured to execute instructions stored in the non-transitory computer-readable medium to:
determine label information for each of a plurality of areas of interest, wherein each of the plurality of areas of interest correspond to a fingerprint, and wherein the label information comprises an indication of a dead zone; and
annotate the location map using the label information.

13. The computing system of claim 12, wherein the label information further comprises a name or a graphical representation corresponding to the fingerprint.

14. The computing system of claim 1, wherein the trained machine learning model determines that the current position corresponds to the fingerprint within the location map based on the one or more signal strength readings by:
retrieving the location map, wherein the location map comprises a plurality of fingerprints that are derived from a corpus of location information;
determining a probability that the current position corresponds to the fingerprint within the location map; and
determining the probability that the current position corresponds to the fingerprint exceeds a threshold value.

15. A method comprising:
receiving, by a processor, a service request from a communication device, the service request comprising one or more signal strength readings associated with a current position of the communication device;
determining, using a trained machine learning model, the current position corresponds to a fingerprint within a location map based on the one or more signal strength readings; and
outputting, by the processor, a control signal configured to cause the communication device to a state of the communication device based on location information associated with the fingerprint, wherein the state of the communication device comprises a source or type of network connectivity, wherein the one or more signal strength readings are a first signal strength reading, wherein the current position is a first position, wherein the fingerprint is a first fingerprint, wherein the location information associated with the first fingerprint is first location information, wherein the control signal is a first control signal;

receiving, by the processor, a second signal strength reading from the communication device;

determining, using the trained machine learning model, a second position that corresponds to a second fingerprint; and outputting, by the processor, a second control signal configured to cause the communication device to alter the source or type of network connectivity of the communication device based on second location information associated with the second fingerprint.

16. The method of claim 15, wherein the source or type of network connectivity is at least one of a cellular service, a Wi-Fi service, or a P2P connection, and wherein altering the state of the communication device comprises at least one of: changing a service provider, changing a cellular service, changing a Wi-Fi service, changing a Wi-Fi network, changing a Wi-Fi AP, changing a SIM card, changing a P2P connection, enabling a radio, enabling a modem, enabling a service, disabling a radio, disabling a modem, or disabling a service in the communication device.

17. The method of claim 15, further comprising:

determining label information for each of a plurality of areas of interest, wherein each of the plurality of areas of interest correspond to a fingerprint, and wherein the label information comprises (i) an indication of a dead zone and (ii) a name or a graphical representation corresponding to a respective area of interest that is mapped to the fingerprint; and annotating the location map using the label information.

18. A non-transitory computer-readable medium comprising program code executable by a processor to cause the processor to train a machine learning model to:

receive a service request from a communication device, the service request comprising one or more signal strength readings associated with a current position of the communication device;

determine the current position corresponds to a fingerprint within a location map based on the one or more signal strength readings, wherein the location map comprises a plurality of fingerprints;

output a control signal configured to cause the communication device to alter a state of the communication device based on location information associated with the fingerprint, wherein the state of the communication device comprises a type of network connectivity, wherein the one or more signal strength readings are a first signal strength reading, wherein the current position is a first position, wherein the fingerprint is a first fingerprint, wherein the location information associated with the first fingerprint is first location information, and wherein the control signal is a first control signal, receive, by the processor, a second signal strength reading from the communication device;

determine a second position that corresponds to a second fingerprint; and output, by the processor, a second control signal configured to cause the communication device to alter the source or type of network connectivity of the communication device based on second location information associated with the second fingerprint.

* * * * *